Figure 1:
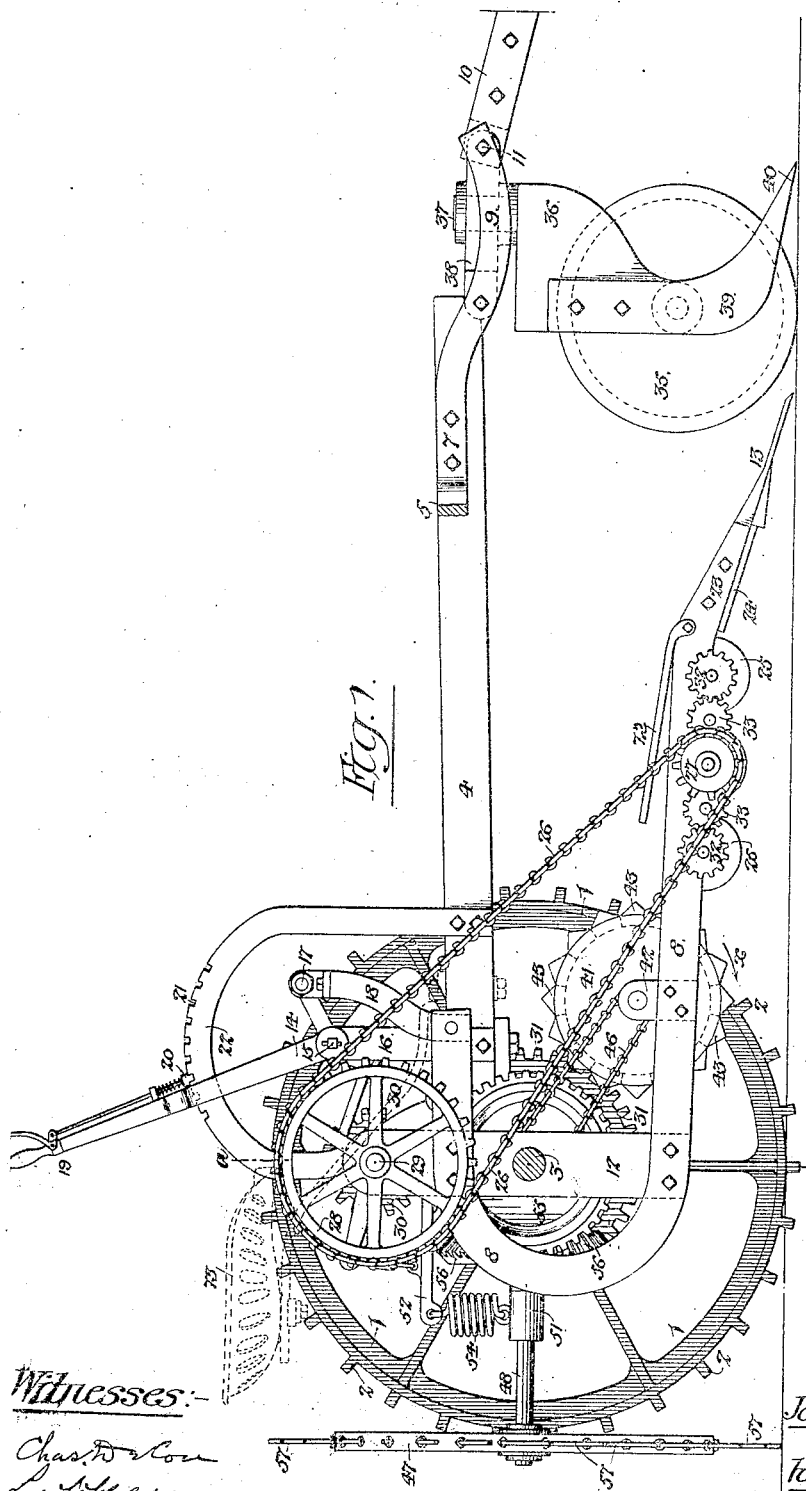

No. 771,800. PATENTED OCT. 4, 1904.
J. S. ROBBINS.
POTATO DIGGER.
APPLICATION FILED DEC. 7, 1900.
NO MODEL. 3 SHEETS—SHEET 1.

Witnesses:—
Chas. D. Noe
Louis M. Colishead

Inventor:—
Josiah S. Robbins
— by —
his Attorneys:—
Howson & Howson

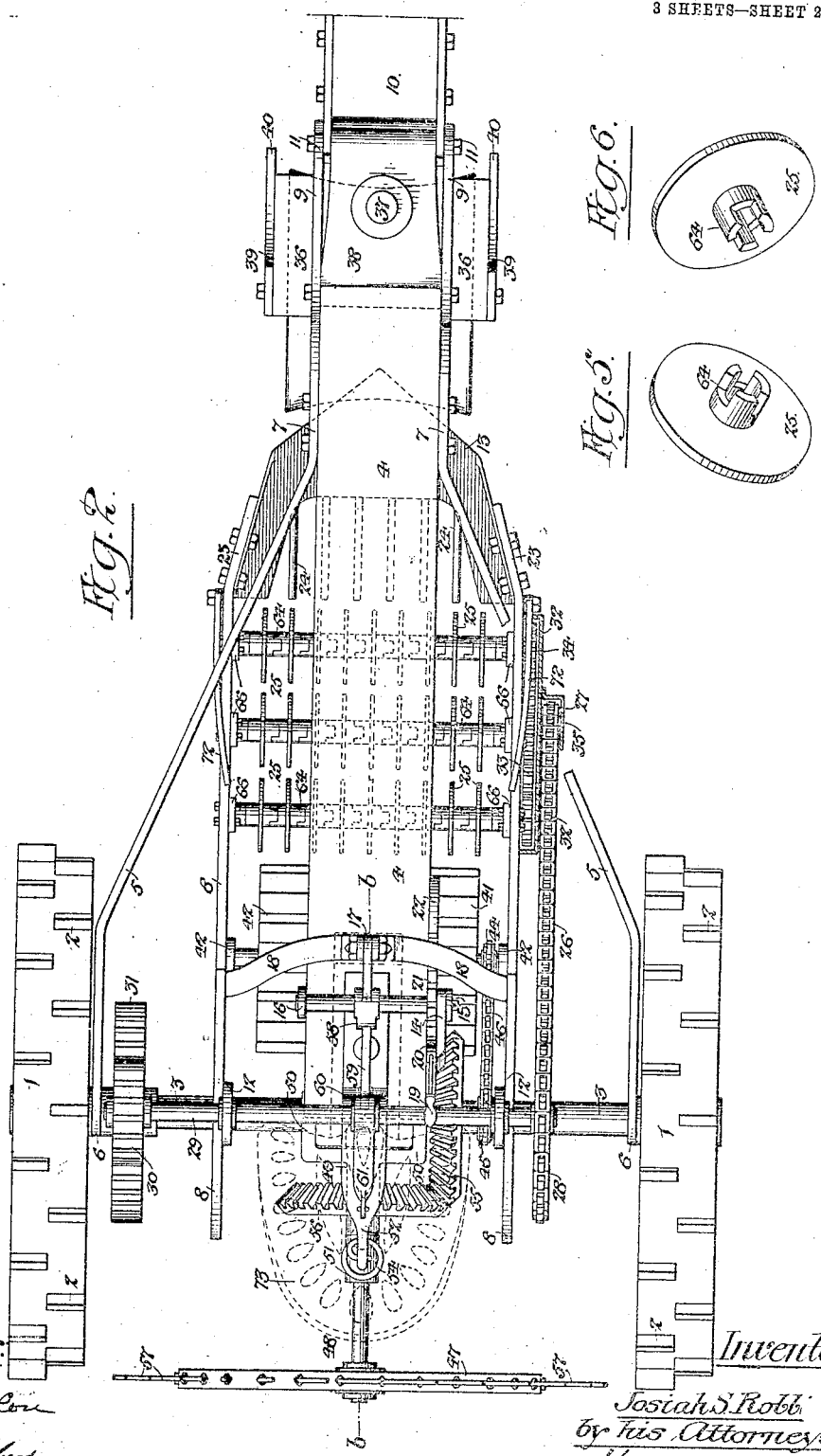

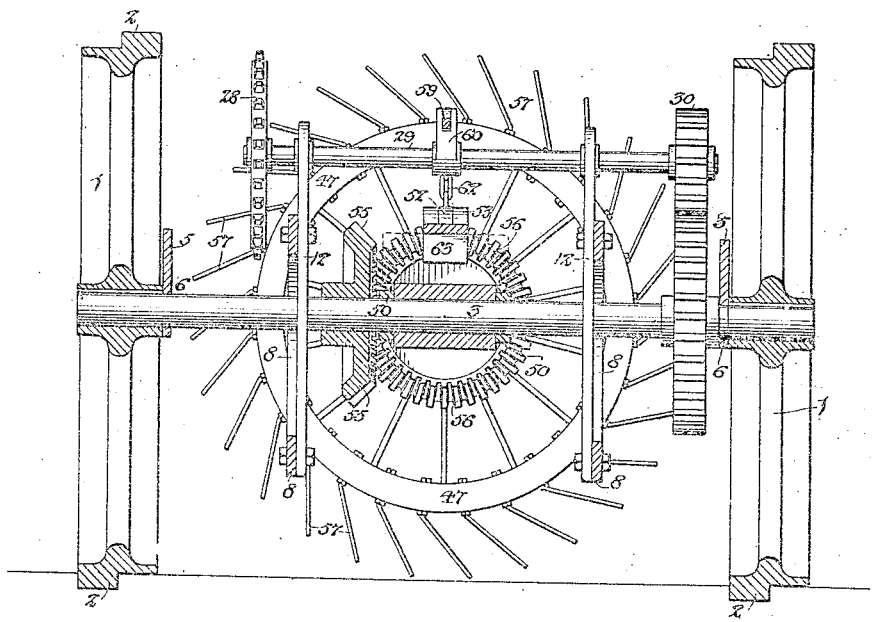

No. 771,800. Patented October 4, 1904.

UNITED STATES PATENT OFFICE.

JOSIAH S. ROBBINS, OF ALLENTOWN, NEW JERSEY.

POTATO-DIGGER.

SPECIFICATION forming part of Letters Patent No. 771,800, dated October 4, 1904.

Application filed December 7, 1900. Serial No. 39,054. (No model.)

*To all whom it may concern:*

Be it known that I, JOSIAH S. ROBBINS, a citizen of the United States, and a resident of Allentown, New Jersey, have invented certain Improvements in Potato-Diggers, of which the following is a specification.

My invention consists of an improved potato-digger of such construction and arrangement that I am enabled to dig the potatoes readily, separate the earth from the same, and finally remove to one side of the row the vines to which the potatoes were attached when in the ground, together with all weeds and grass that may be found with the vines.

My invention also includes a special device for gathering the vines into a row directly in line with the plow of the machine, whereby said vines will be confined between the main frame of the machine without danger of clogging any of the moving parts of the apparatus until they are caught by special means located at the rear of the machine and swept away from the potatoes.

My invention is fully illustrated in the accompanying drawings, in which—

Figure 1 is a side elevation of the machine with one of the wheels removed. Fig. 2 is a plan view of the machine. Fig. 3 is a cross-sectional view of the machine, taken on the line $a\ a$, Fig. 1. Fig. 4 is a sectional elevation of a part of the machine, taken on the line $b\ b$, Fig. 2. Figs. 5 and 6 are views illustrating details of my invention, and Figs. 7 and 8 are views illustrating modifications of certain parts of my improved machine.

In all forms of potato-diggers the ultimate end to be attained is to leave the potatoes in a row on the ground from which they may be readily picked up and placed in baskets or bags and to separate the vines, weeds, and grass from the potatoes, so that the former may be readily raked up for burning or other disposition.

My improved machine comprises means whereby the vines are gathered in a narrow row before the plow reaches its work, the potatoes are loosened from the clinging earth immediately after they have been dug by the plow, and the loosened vines are kept within the space of the main frame of the machine as the digging operation progresses, said vines, together with all weeds and grass that may be found with the same, being finally removed by special means carried at the rear of the machine.

In the machine forming the subject of my invention, 1 1 represent the traction-wheels, preferably provided with heavy lags 2, whereby the traction is increased and the different parts of the machine positively driven by the movement of said wheels. These wheels 1 are carried by an axle 3, which also serves to carry the entire framework of the machine, such framework comprising the central beam 4, side arms 5, mounted on the axle near the wheels, as at 6, and secured to the forward end of the beam, as at 7, and the U-shaped side members 8. The arms 5 are also provided with projecting members 9, to which the tongue 10 of the machine is connected at 11.

Carried by the U-shaped members 8, the upper and lower portions of which members are secured together by cross-bars 12, through which the axle 3 of the machine passes, is the plow or shovel 13. These U-shaped members are pivotally mounted on said axle, so that the plow may be raised or lowered, as desired, and for this purpose I provide the lever 14, pivoted at 15 to a standard 16, mounted on the beam 4, said lever being connected at its opposite end 17 to a cross-bar 18, connecting said U-shaped members 8. The lever 14 is provided with a suitable handle 19, so that the frame formed by said U-shaped members may be raised and lowered, and to provide for the support of this frame in a predetermined position the handle 19 has a spring-controlled bolt 20 adapted to enter notches 21 in a segmental rack 22, carried by the beam 4.

The plow or shovel 13 is preferably of the shape shown and is secured at 23 to the lower front ends of the U-shaped members 8. This plow or shovel is cut away at its rear central portion and carried by the shovel, and adapted to extend into this space are a series of tines 24, over which the earth and potatoes are passed and which permits the partial separation of the earth and potatoes as the latter pass from the same.

Arranged between the U-shaped members 8 and directly in the rear of the tines 24, carried by the shovel 13, are a series of disks 25, which are rotated in the opposite direction to the movement of the machine and tend to carry rearwardly the mass of earth, potatoes, and vines plowed up by the machine. These disks, arranged in gangs, as shown, are spaced apart so that the loose earth may fall between the same, but sufficiently close together to insure the passage of the potatoes over the same. These gangs of disks are positively driven as the machine is moved forward by means of a chain 26, passing over a sprocket-wheel 27, carried by the shaft of the middle gang of disks, said chain deriving its power from a sprocket-wheel 28, mounted on a shaft 29, the latter receiving its movement from the main axle 3 of the machine through the medium of the gear-wheels 30 and 31, the latter being carried by said axle 3. The shaft of each gang of disks has a gear-wheel 32, and mounted on the frame between said wheels are the intermediate gears 33, so that the movement imparted to the sprocket-wheel 27 serves to drive the entire series of disks in a direction opposite to the movement of the machine. The driving-gears and intermediates are preferably inclosed by a suitable casing 34, so that there will be no danger of clogging these moving parts by any earth or stones thrown up by the plow, and the casing 34 carries a guard-piece 35 to protect the sprocket-wheel 27 and a portion of the chain 26.

The shaft 29, carrying the sprocket-wheel 28 and gear-wheel 30, is journaled in suitable bearings carried by the cross-pieces 12 of the U-shaped members 8. These parts will be moved rearwardly as the plow is lifted from the earth, and as there is no necessity of the gangs of disks rotating when the digging operation is completed I may provide special means for moving the shaft 29 so that the pinion 30 will be thrown out of engagement with the gear-wheel 31 as the plow is raised.

In machines of this character it is particularly desirable that the vines and all accompanying weeds and grass be confined in as close a space as possible before the ground is opened, and for this purpose I arrange at the front of the machine a concaved roller 35, having a mounting similar to an ordinary caster, comprising a frame 36, in which it is journaled, said frame 36 having a pin 37, adapted to a suitable bearing or opening in a block-casting 38, disposed between the beam 4 of the machine and the tongue 10. Carried by the box or frame of this roller are a pair of arms 39, curved in a forward direction and having their points 40 arranged close to the ground. These arms pass under the vines and serve to gather them in as the machine is moved forward, so that they may be crushed by the roller 35. This gathering of the vines prevents their spreading apart after the plow or shovel has done its work and the vines are confined within the space of the machine and without danger of clogging any of the working parts.

Although I have shown and described means for gathering the vines and weeds in a row in advance of the plow and for crushing the same, so as to reduce their bulk and enable them to pass through the space bounded by the frame of the machine, I make no claim to the same herein, such mechanism forming the subject of an application for patent filed by me on the 17th day of September, 1904, Serial No. 224,791.

To insure the passage of the main axle of the machine over the vines as they are drawn under the same, I provide another crushing-roller, 41, carried by suitable arms 42, secured to the U-shaped members 8, and this roller has a corrugated face made up of a series of angular slats 43, so that there will be no danger of the vines bunching up in front of the roller, as might be possible with a smooth roller. This roller may be positively driven by means of the sprocket-wheels 44 and 45 and chain 46 or may receive its movement by contact with the mass of vines. In either instance it moves in the direction indicated by the arrow $x$ and serves the purpose of keeping the vines out of contact with the axle of the machine.

At the rear of the machine I mount a wheel 47, secured to an axle 48, which is journaled in a bearing 49, having arms 50, by means of which it is pivoted to the axle 3 of the machine, said axle 48 being supported by means of a swinging bearing 51, hung from an arm 52, hinged at 53 to the beam 4 by a spring 54.

Splined or otherwise secured to the main axle 3 of the machine is a bevel-gear 55, meshing with a similar gear-wheel 56, secured to the shaft or axle 48 and serving to drive the wheel 47 at an angle to the machine as the latter is moved. This wheel 47 is provided with a series of bent fingers 57, suitably secured to the rim of the said wheel, and these fingers serve to throw the vines clear of the potatoes as said wheel is rotated. The path of the wheel will resemble a portion of a screw-thread of an extremely deep pitch, being due to the fact that said wheel is moved forward and revolved at the same time.

I provide the spring bearing-support above described, so that the wheel may lift when passing over an obstruction, and the fingers 57 are preferably arranged so as to just clear the ground when the wheel 47 is suspended from its spring-support, as shown in Figs. 1 and 5.

When the potato-digger is not in use, the wheel 47 may be raised out of its operative position (shown in Figs. 1 and 4) in the following manner: Carried by the lever 14 is a depending arm 58, which is connected, by means of a link 59, with the arm 60 of a bell-crank lever mounted on the shaft 29, the other arm, 61, of this bell-crank lever being connected, by means of the chain 62, with the hinged arm 52, which supports the swinging bearing 51. The axle 48 of the wheel 47 being journaled in said swinging bearing, said wheel may be raised by moving the lever 14 rearwardly, as such movement will raise the swinging bearing through the connections just described, and clearly shown in Fig. 4. The wheel 47 is shown in the normal operative position and is prevented from dropping any lower by the stop 63, carried by the hinged arm 52, said stop abutting against the end of the beam 4. The plow, however, is shown raised from the ground, but not in position to be transported. The movement of the lever 14 to raise the wheel 47, however, will also raise the plow to a safe position for movement from place to place when not digging. The gangs of clearing or cleaning disks (shown in Fig. 2) are arranged in line, as shown, so as to provide the best means for breaking up and carrying away the earth surrounding and clinging to the potatoes. These disks are spaced apart about an inch and a-half and are provided with clutch-hubs 64, (clearly shown in Figs. 5 and 6,) so that they may be held in place and be readily turned by means of a single shaft 65 passing through the same, the latter being keyed thereto and having its end mounted in brackets 66, secured to the U-shaped members 8 by means of suitable nuts and washers.

Under most conditions I prefer that the gangs of disks shall be of the same diameter throughout; but in light ground it may be advantageous to use for the last series disks somewhat less in diameter than those of the first two series. Such construction I have shown in Figs. 7 and 8, in which the last series of disks 25$^a$ are one-half the diameter of the others, the smaller disks being shown with their lower surfaces on the same plane with the larger disks. Such construction as this is more or less advantageous in light ground, such as sandy loam, as the same is more readily separated from the potatoes than the heavy earth or clayey soil. In order, however, that this construction may be used in the heavier soils, the shaft of the gang of smaller disks is carried by swinging arms 67, pivoted to bosses 68, which latter are secured to the U-shaped frames of the machine and have set-screws 69 or other means whereby said disks 25$^a$ may be arranged in any suitable position with respect to the other series of disks, the U-shaped members 8 having depending portions 70, with slots 71 for said set-screws. As a further means of keeping the vines clear of the working parts of the machine I may secure to the U-shaped frames 8 adjacent to the plow the arms 72, which are adjustable to any desired position.

The machine is provided with the usual spring-supported seat 73, (shown in dotted lines,) secured to the beam and preferably mounted directly over the main axle of the machine.

Having thus described my invention, I claim and desire to secure by Letters Patent—

1. The combination in a potato-digger, of the frame, a digging member carried thereby and adapted to be drawn through the ground, and a series of rotatable, concentrically-mounted disk plates having circular peripheries and arranged at the rear of said digging member, said plates providing a moving platform having a surface which constantly maintains the same plane and serves to receive the material raised by the digging member, separate the looser portions and pass the balance to the rear of the machine.

2. The combination in a potato-digger, of the frame, a digging member carried thereby, a series of rotatable, concentrically-mounted disk plates having circular peripheries and journaled in suitable bearings at the rear of the digging member, said plates forming a platform having a surface which constantly maintains the same plane and serves to receive the material raised by the digging member, separate the looser portions and support the balance, and means for rotating said disk plates whereby the material carried by the same will be positively moved to the rear of the machine.

3. The combination in a potato-digger, of the frame, a digging member carried by said frame and adapted to be drawn through the ground, said digging member being cut away at the rear, a series of fingers arranged within the cut-out portion of the digging member and extending rearwardly in line with the frame, such fingers serving to receive and support the material raised by the digging member and provide for the preliminary separation of the earth from the potatoes, and a series of rotatable, concentrically-mounted disk plates having circular peripheries and arranged at the rear of said digging member, said plates providing a moving platform having a surface which constantly maintains the same plane and serves to receive the material raised by the digging member and pass it to the rear of the machine, at the same time permitting separation of the earth from the potatoes.

In testimony whereof I have signed my name to this specification in the presence of two subscribing witnesses.

JOSIAH S. ROBBINS.

Witnesses:
   Jos. N. Hankins,
   James H. Gordon.